US010634258B1

United States Patent
Kennedy et al.

(10) Patent No.: US 10,634,258 B1
(45) Date of Patent: Apr. 28, 2020

(54) INTAKE MANIFOLD WITH PCV CHECK VALVE RETAINER

(71) Applicant: RB Distribution, Inc., Colmar, PA (US)

(72) Inventors: Patrick Thomas Kennedy, Perkasie, PA (US); Michael Paul Capko, Harleysville, PA (US); Timothy Lee Collins, Oxford, MI (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 16/447,375

(22) Filed: Jun. 20, 2019

Related U.S. Application Data

(63) Continuation of application No. 16/242,620, filed on Jan. 8, 2019.

(51) Int. Cl.
    *F16K 15/14*     (2006.01)
    *F02M 35/10*     (2006.01)

(52) U.S. Cl.
    CPC ......... *F16K 15/14* (2013.01); *F02M 35/1034* (2013.01); *F02M 35/10222* (2013.01)

(58) Field of Classification Search
    CPC ......... F02M 25/0836; F02M 35/10229; F02M 35/10065; F02M 21/0242
    See application file for complete search history.

(56) References Cited

U.S. PATENT DOCUMENTS

| 3,589,347 | A | | 6/1971 | Sawada | |
|---|---|---|---|---|---|
| 5,377,650 | A | * | 1/1995 | Warner | F01N 3/22 123/568.29 |
| 2003/0106516 | A1 | * | 6/2003 | Nishimura | F02M 35/10111 123/184.42 |
| 2004/0261745 | A1 | * | 12/2004 | Kito | F02D 9/1095 123/184.42 |
| 2005/0016487 | A1 | * | 1/2005 | Ikuma | F02M 35/112 123/184.42 |
| 2006/0243329 | A1 | * | 11/2006 | Doble | F02M 37/0023 137/542 |
| 2008/0092864 | A1 | | 4/2008 | Suzuki | |
| 2013/0019844 | A1 | * | 1/2013 | Kulkarni | B60K 15/03504 123/520 |
| 2014/0373953 | A1 | * | 12/2014 | Spanevello | F16K 15/148 137/854 |
| 2015/0020784 | A1 | * | 1/2015 | Rice | F01M 13/0011 123/572 |
| 2018/0252129 | A1 | * | 9/2018 | Bonne | F01M 13/0011 |

OTHER PUBLICATIONS

CruzeTalk.com, Forums, "2011-2016 Cruze 1.4L PCV System Explained", https://www.cruzetalk.com/forum/34-gen1-1-4l-turbo/175793-2011-2016-cruze-1-4l-pcv-system-explained.html#post2549201 (Aug. 22, 2016).

Dre Dan, YouTube, "Chevy Cruze & Sonic 1.4L Turbo PCV Issues, Diagnosis, and Solutions" (published Jun. 2, 2018) available at https://www.youtube.com/watch?v=En4WO7DYsTk.

* cited by examiner

*Primary Examiner* — Long T Tran

(74) *Attorney, Agent, or Firm* — Vole and Koenig, P.C.

(57) ABSTRACT

An intake manifold with an internal check valve that operates in coordination with a Positive Crankcase Valve has a check valve retainer that is mounted within the manifold and contacts the check valve to maintains the check valve in position and avoid dislodgement.

15 Claims, 5 Drawing Sheets

INTAKE MANIFOLD WITH PCV CHECK VALVE RETAINER

CROSS REFERENCE TO RELATED APPLICATION

This application claims the benefit of U.S. patent application Ser. No. 16/242,620, filed Jan. 8, 2019, which is incorporated by reference as if fully set forth.

FIELD OF INVENTION

The present invention relates generally to securing a check valve against being dislodged from intended position. More particularly, the invention relates to securing a check valve that is positioned with a manifold.

BACKGROUND

Certain engines, such as those found in the Chevrolet Cruz and Buick encore, have a check valve in the intake manifold. These engines have a high failure rate associated with the check valve being dislodged from its intended position.

The intake manifold basically has two chambers. The intake chamber and the PCV chamber with the check valve, which is an umbrella or mushroom like diaphragm that is retained in position by a nipple that is held with a press fit. The check valve allows positive crankcase ventilation (PVC) of combustion gases that by pass the piston rings into the crankcase. When the check valve is open, the PCV recycles the air into the intake chamber. When there is a load that creates a pressure boost, the check valve closes and prevents the flow of air into the crankcase. When the check valve is dislodged and fails to function properly, there is a back flow into the crankcase.

In other words, proper engine operation, the check valve allows gas to freely flow into the intake chamber when the engine is under vacuum, but block that gas flow under boost conditions. While the original equipment manufacturer (OEM) intake manifold check valve initially works well, it fails prematurely and can disappear altogether when it is dislodged.

Some prior attempts are correcting the problem have suggested method of modifying the manifold and there are kits available for that purpose. However, such modification may have unintended consequences if not performed by a skilled mechanic or may void some aspects of the manufacturer's warranty.

Accordingly there is a need for better securing the check valve in its proper operating position.

SUMMARY

The present invention maintains the OEM design of the intake chamber and PCV chamber by providing an insert that fixes the check valve in the proper location and avoid dislodging of the check valve.

BRIEF DESCRIPTION OF THE DRAWINGS

The solution of the present invention will be better understood with reference to the following drawings where.

DETAILED DESCRIPTION OF THE PREFERRED EMBODIMENTS

Figure 1:
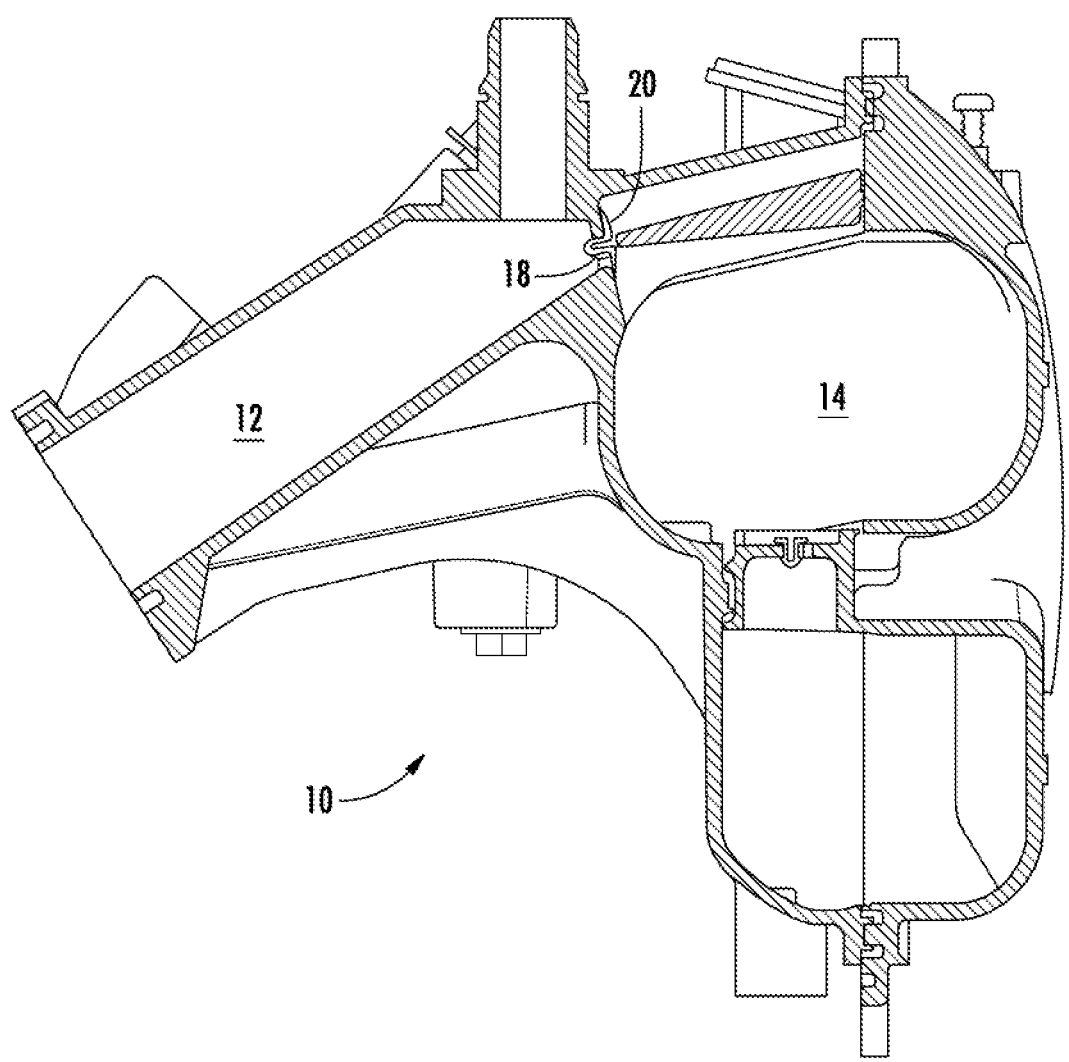
FIG. 1 illustrates a sectioned manifold to locate the internal PVC check valve in the manifold and the placement of the retainer.
Figure 2:
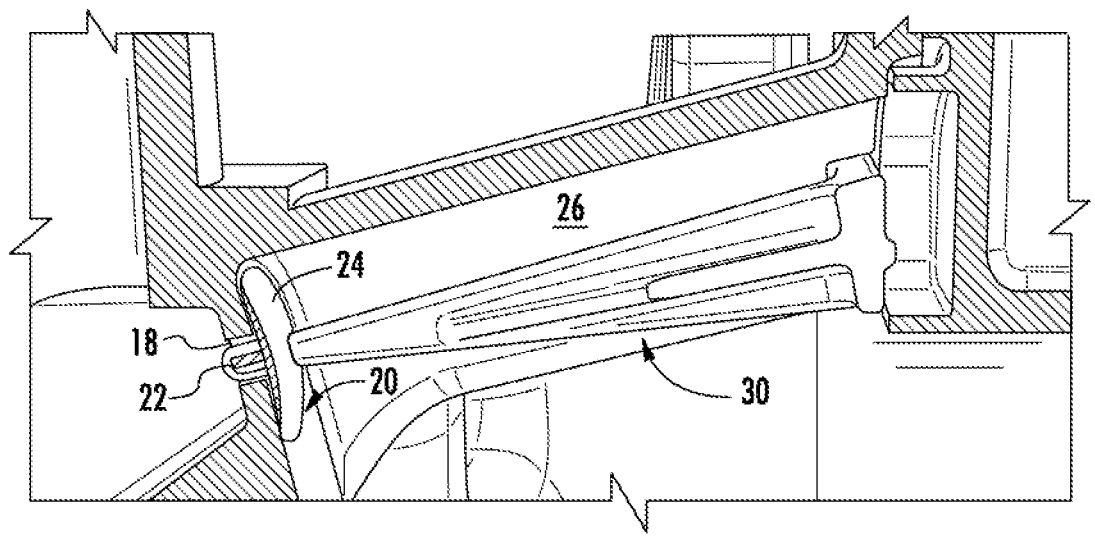
FIG. 2 is an enlarged illustration of the illustration of the retainer in contact with the check valve.

With reference to FIGS. 1 and 2, the manifold 10 is typically molded in at least two sections or shells and they are welded together to form the chambers 12 and 14 on either side of an interior wall 16 that has a plurality of gas exchange vent holes 16-1 to 16-X and a central opening 18 that secures a check valve 20 so that the check valve is wholly within the manifold 10. The gas exchange vent holes 16-1 to 16-X around a central opening 18 are in accordance with OEM specifications and the central opening is dimensioned to receive a nipple 22 extending from the check valve 20 in accordance with OEM specifications. The check valve 20 has a slightly curved cap 24, shaped somewhat like a mushroom or an umbrella, which forms a movable flap. The preferred retainer 30 contacts the top of cap 24 directly over the nipple 22 so it does not interfere with the operation of the cap 24.

Figure 3:
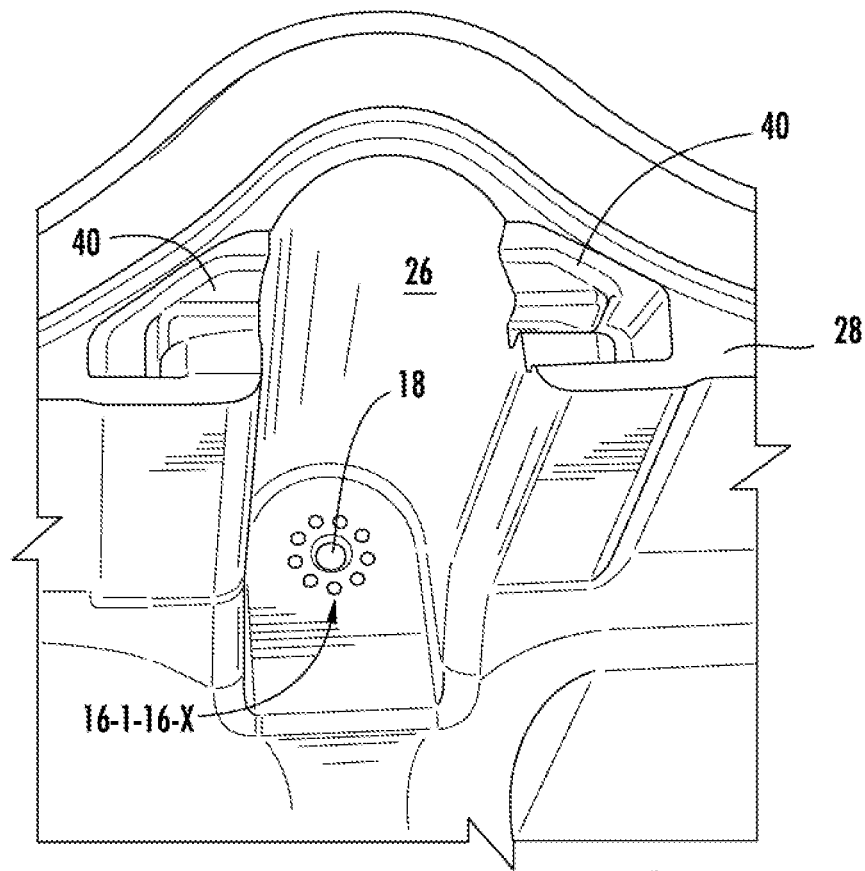
FIG. 3 illustrated the manifold position of the check valve without the check valve in place.
Figure 4:
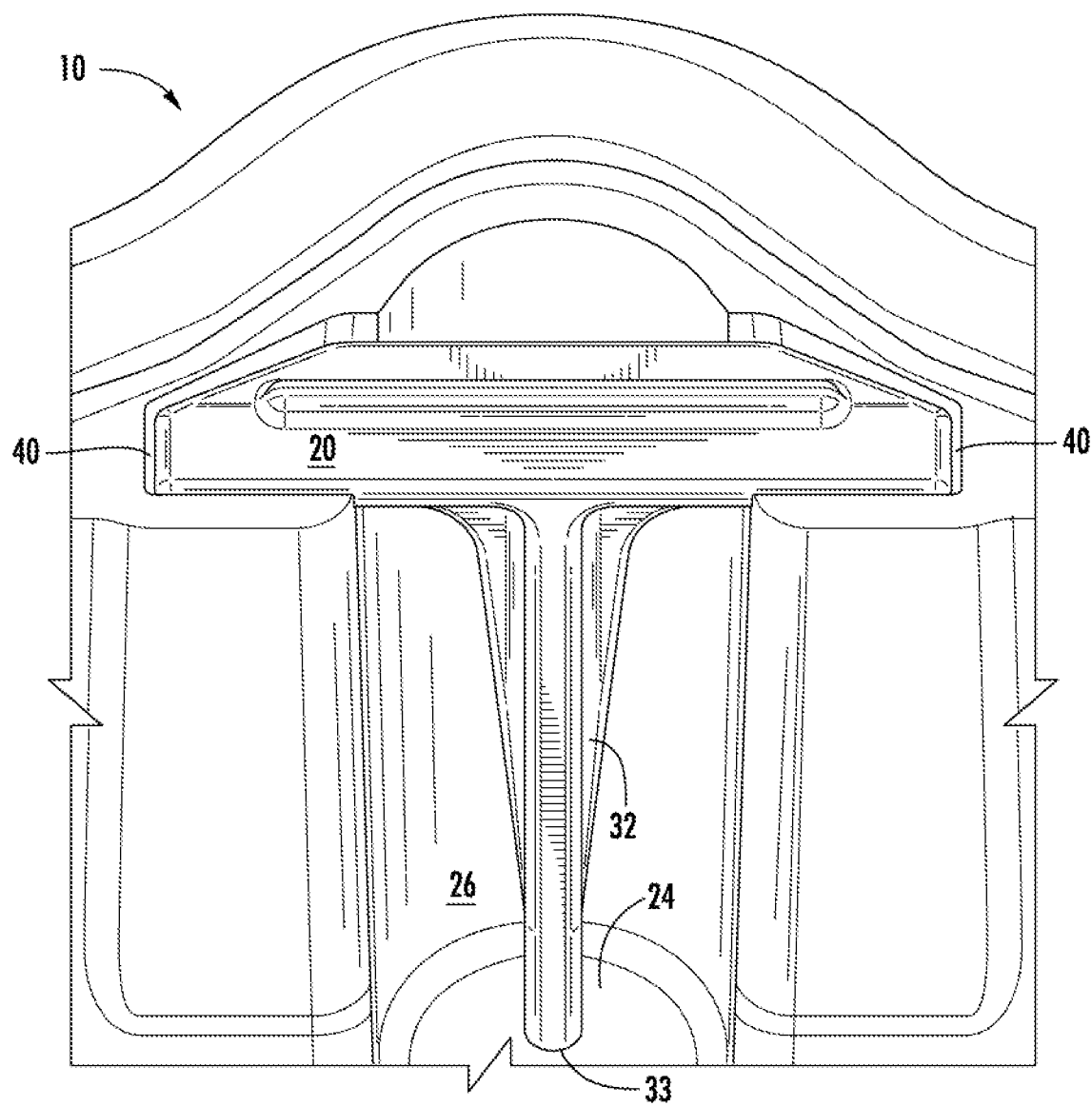
FIG. 4 illustrates the retainer and check valve in place within the manifold cavity illustrated in FIG. 3.

With reference to FIG. 3, the gas exchange area 16 forms a floor in an arcuate chamber 26 which has a modified upper surface 28 that receives retainer 30. The upper surface 28 is modified from the OEM configuration to have two wells or recesses 40 on the sides of arcuate chamber 26. The recesses 40 are shaped to receive the retainer 30 without interference to the manifold sections sealing and with minimum restrictions to flow in the arcuate chamber 26. The retainer 30 is preferably heat staked and held in place between the sections of manifold 10.

Figure 5:
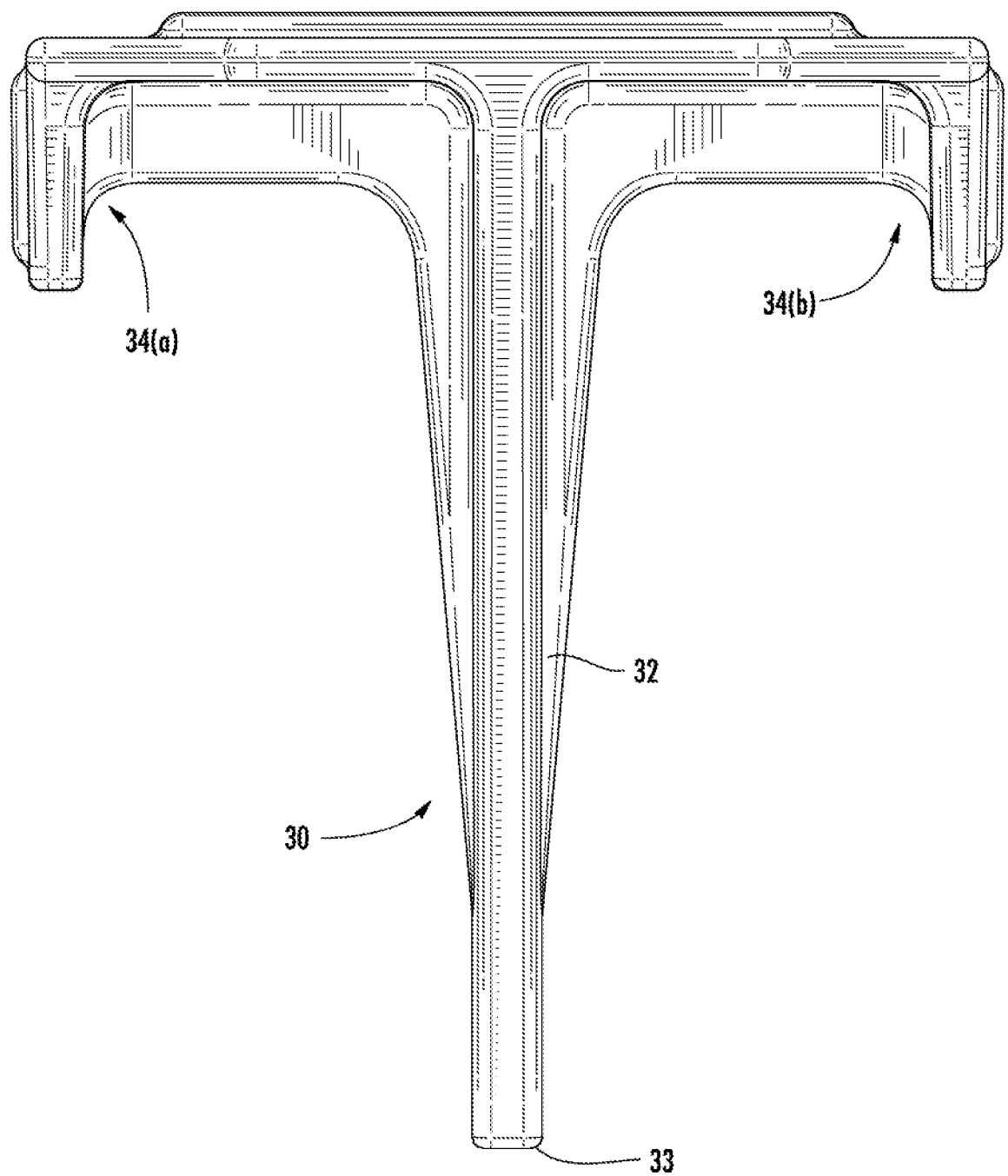
FIG. 5 illustrates a retainer configuration.
Figure 6:
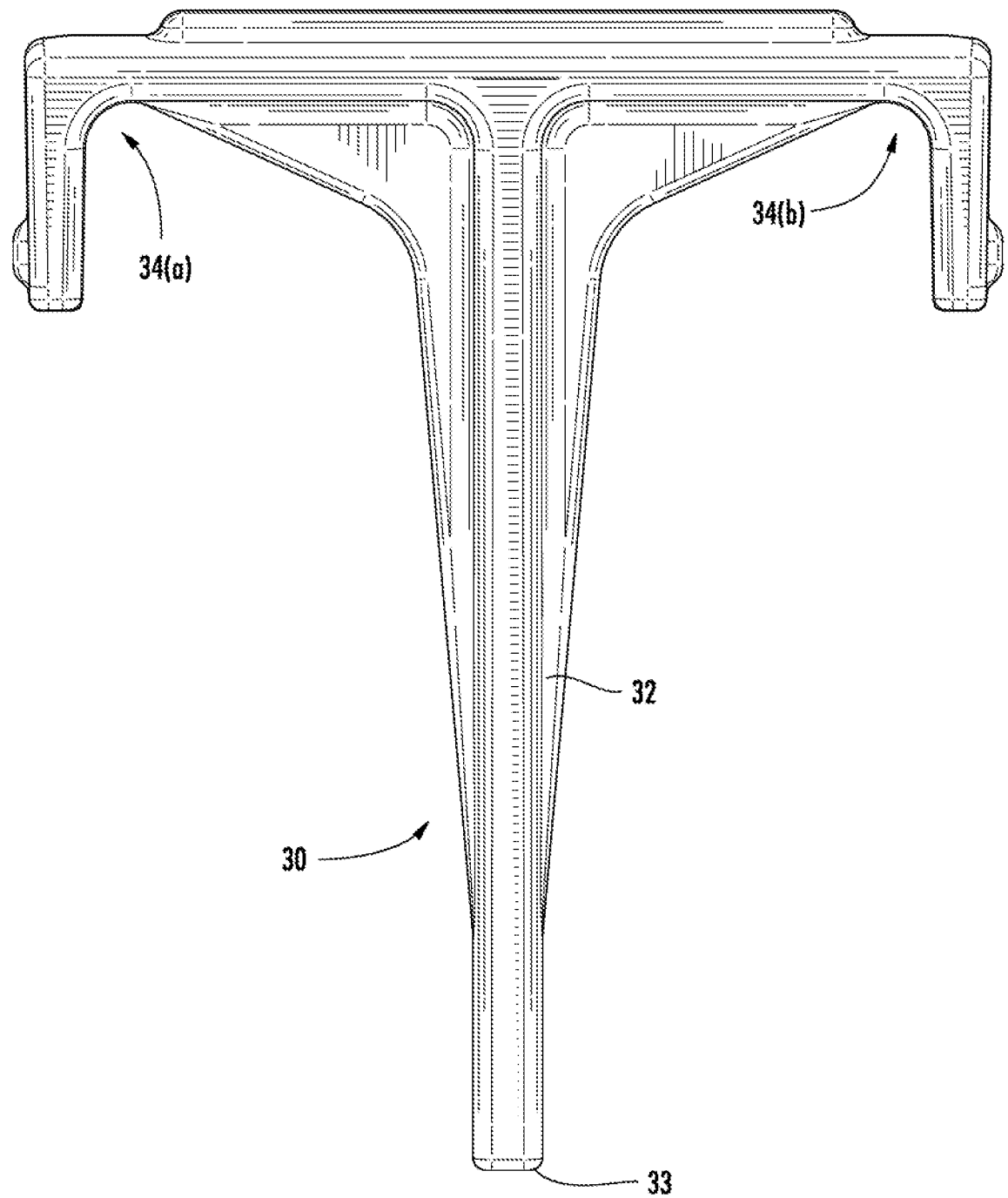
FIG. 6 illustrates an alternative retainer configuration.

With reference to FIGS. 5 and 6, the retainer 30 has a post or stem 32 with a length below the shoulders 34(a) and 34(b) so that the tip 33 engages the cap 24 when the shoulders 34(a) and 34(b) are positioned in the respective well or recess 40 of the manifold 10. The width or space between the shoulders is preferable selected to span the width of the arcuate chamber 26. The shape and degree of taper of the stem 32 between tip 33 and shoulders 34(a) and 34(b) can be selected to facilitate molding of the retainer 30 and the thickness or heft of the retainer 30 is determined by the material selected to mold the retainer 30. The selected molding material should have thermal properties sufficient to withstand the range of engine temperatures without deforming. PA6 (nylon 6) with 30% Glass Fill has been found to be an acceptable molding material for the retainer and the manifold.

What is claimed is:

1. An intake manifold comprising:
   a body having an interior wall that is positioned between at least two chambers and includes at least one opening that is between the at least two chambers and is surrounded by a plurality of apertures;
   a check valve with a first side that covers the plurality of apertures and includes a nipple that is engaged in the at least one opening; and,
   a check valve retainer that contacts a second side of the check valve and retains the nipple in the at least one opening.

2. The intake manifold of claim 1, wherein the check valve retainer contacts the second side directly opposite the nipple.

3. The intake manifold of claim 1, wherein the check valve retainer is molded of PA6 (nylon 6) with 30% Glass Fill.

4. The intake manifold of claim 1, wherein the body further includes an arcuate chamber.

5. An intake manifold comprising:
   a body having an interior wall that is positioned between at least two chambers and includes at least one opening between the at least two chambers;
   a check valve with a first side that includes a nipple that is engaged in the at least one opening; and,
   wherein the check valve retainer is generally "T" shaped and one of the at least two chambers includes an upper surface configured to receive a portion of the check valve retainer.

6. An intake manifold comprising:
   a body including a first chamber and a second chamber and one of the first chamber and the second chamber includes an arcuate chamber with an upper surface configured to receive a portion of a generally "T" shaped check valve retainer;
   a wall separating the first chamber and the second chamber, the wall including a plurality of apertures formed in a circle around an inner opening;
   a check valve that overlies the plurality of apertures and includes a dependent nipple that is engaged with the inner opening; and,
   the check valve retainer engages the check valve in a position opposite to the dependent nipple and retains the nipple in the inner opening.

7. The intake manifold of claim 6, wherein the check valve retainer is molded of PA6 (nylon 6) with 30% Glass Fill.

8. The intake manifold of claim 6, wherein the check valve further includes a cap.

9. The intake manifold of claim 8, wherein the cap includes flexible flaps.

10. An intake manifold comprising:
    a manifold body having at least two chambers separated by a dividing wall having a plurality of apertures;
    a check valve that includes a cap having a first side, a second side and a nipple;
    the nipple depends from one of the first side and the second side and is dimensioned to engage with one of the plurality of apertures; and,
    a check valve retainer that includes a stem and at least one shoulder and contacts the cap on a side opposite to the nipple and retains the nipple engaged in one of the plurality of apertures.

11. The intake manifold of claim 10, wherein the retainer is molded of PA6 (nylon 6) with 30% Glass Fill.

12. The intake manifold of claim 10, wherein the stem is connected to the at least one shoulder at a first end and includes a tip at a second end.

13. The intake manifold of claim 12, wherein the tip contacts the cap.

14. The intake manifold of claim 12, wherein the check valve retainer is generally "T" shaped and one of the at least two chambers includes an upper surface configured to receive the at least one shoulder of the check valve retainer.

15. The intake manifold of claim 10, wherein the cap includes flexible flaps.

* * * * *